United States Patent Office 3,381,000
Patented Apr. 30, 1968

3,381,000
CERTAIN 11-BASIC SUBSTITUTED-5,6-DIHYDRO-MORPHANTHRIDINE COMPOUNDS
Alexander E. Drukker, Milwaukee, and Claude I. Judd, Mequon, Wis., assignors to Colgate-Palmolive Company, a corporation of Delaware
No Drawing. Continuation-in-part of application Ser. No. 170,803, Feb. 2, 1962, which is a continuation-in-part of application Ser. No. 111,141, May 19, 1961. This application Oct. 16, 1963, Ser. No. 316,512
25 Claims. (Cl. 260—239)

ABSTRACT OF THE DISCLOSURE

The compounds are basic 11-substituted-5,6-dihydromorphanthridines useful as pharmaceutical agents, per se, and in the purification of penicillin. A compound disclosed is 5-methyl-11-(3-dimethylaminopropylidene)-5,6-dihydromorphanthridine.

---

This invention relates to novel chemical compounds and processes of preparing the same. More particularly, this invention is concerned with novel basic 5,6-dihydromorphanthridine derivatives, processes of producing them and pharmacological and therapeutic uses for such compounds.

This application is a continuation-in-part of our copending application Ser. No. 170,803 filed Feb. 2, 1962, now U.S. Patent 3,153,652, which is a continuation-in-part of our application Ser. No. 111,141 filed May 19, 1961, and now abandoned.

According to one aspect of this invention there are provided novel compounds of the formula

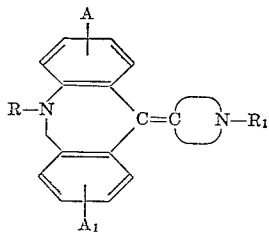

Formula 1 wherein A and $A_1$ are hydrogen, a halo group such as the chloro and bromo groups, a lower alkoxy such as methoxy and ethoxy, a lower alkyl such as methyl, a lower alkyl-thio such as thiomethyl and thioethyl, and trifluoromethyl, R and $R_1$ are the same or different groups such as hydrogen, a lower alkyl (viz, eight carbons or less) such as methyl, ethyl, propyl, isopropyl and butyl, a lower alkenyl such as allyl, a lower alkynyl such as propargyl, an aralkyl such as phenyl-lower alkyl including benzyl, phenethyl, phenylpropyl, phenylisopropyl and p-chlorobenzyl, as well as diphenylmethyl, trityl and naphthylmethyl, or a phenyl-lower alkenyl such as cinnamyl, and

is a cyclic amino group such as 3-piperidyl, 4-piperidyl, 3-pyrrolidyl, 3-homopiperidyl and 4-homopiperidyl.

According to a further aspect of this invention, there are provided novel basic 5,6-dihydromorphanthridines of the formula

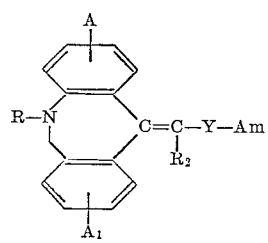

Formula 2 wherein A, $A_1$ and R have the assigned significance, $R_2$ is hydrogen, a lower alkyl (viz, eight carbons or less) such as methyl, ethyl, propyl, isopropyl and butyl, a lower alkenyl such as allyl, phenyl, an aralkyl such as a phenyl-lower alkyl including benzyl, phenethyl, phenylpropyl, phenylisopropyl and p-chlorobenzyl or a phenyl-lower alkenyl such as cinnamyl, Y is a chemical bond or a lower straight or branched alkylene as of 1 to 8 carbons including methylene, ethylene, propylene and isopropylene, and Am is a nitrogen containing group such as a cyclicamino group like 2-, 3- or 4-pyridyl, 2-, 3- or 4-piperidyl, 2 or 3-pyrrolidyl, 2, 3 or 4-homopiperidyl or quinuclidinyl with or without an N-substituent such as a lower alkyl including methyl, ethyl and propyl, phenyl, an aralkyl such as phenyl-lower alkyl including benzyl and phenylethyl as well as di-phenylmethyl, trityl and naphthylmethyl, a lower alkenyl such as allyl or a phenyl-lower alkenyl such as cinnamyl, and Am represents the group

when Y is a lower straight or branched alkylene wherein $R_3$ and $R_4$ are the same or different groups including hydrogen, a lower alkyl such as methyl, ethyl, propyl, isopropyl and butyl, a lower alkenyl such as allyl, an aryl group and particularly phenyl including nuclear substituted phenyl groups, aralkyl groups and particularly phenyl-lower alkyl groups including benzyl, phenylethyl and phenylisopropyl as well as diphenylmethyl, trityl and naphthylmethyl, cycloalkyl groups and particularly such groups having 5 to 7 carbons including cyclopentyl and cyclohexyl, cycloalkyl-lower alkyl groups such as cyclohexyl-methyl and cyclopentyl-ethyl, and groups in which

represents a group such as morpholino, pyrrolidino, piperidino, 1,2,3,4-tetrahydroquinolino, 1,2,3,4-tetrahyisoquinolino, 4-lower alkylpiperazino groups such as 4-methylpiperazino, 4-(phenyl-lower alkyl)-piperazino groups such as 4-benzyl-piperazino and 4-(alpha-methylphenethyl)-piperazino and 4-(hydroxy-lower alkyl)-piperazino groups such as 4-hydroxy-ethylpiperazino.

The compounds of Formulae 1 and 2 of this invention in which R, $R_1$, $R_3$ and $R_4$ are not hydrogen and the cyclicamino groups represented by Am have N-substituents are produced by reacting an 11-alkali metal salt of a 5-substituted-5,6-dihydromorphanthridine with a cyclicamino ketone or an aminoaldehyde or aminoketone to produce a 5-substituted-11-(N-substituted-hydroxycyclicamino)-5,6-dihydromorphanthridine or a 5-substituted-11 - (alpha - hydroxyalkyl-amino)-5,6-dihydromorphanthridine which upon dehydration yields a 5-substituted-11 - [(N - substituted - cyclicamino) - ene]-5,6-dihydromorphanthridine or a 5 - substituted - 11 - (alkylideneamino)-5,6-dihydromorphanthridine. This process can be represented as follows:

Some of the 11-alkali metal salts of 5-substituted-5,6-dihydromorphanthridines which are produced as described are the 11-lithium salts of 5-methyl-5,6-dihydromorphanthridine,
2-chloro-5-methyl-5,6-dihydromorphanthridine,
5-ethyl-5,6-dihydromorphanthridine,
5-isopropyl-5,6-dihydromorphanthridine,
2-trifluoromethyl-5-methyl-5,6-dihydromorphanthridine,
5-benzyl-5,6-dihydromorphanthridine,
5-phenethyl-5,6-dihydromorphanthridine,
5-allyl-5,6-dihydromorphanthridine and
5-cinnamyl-5,6-dihydromorphanthridine.

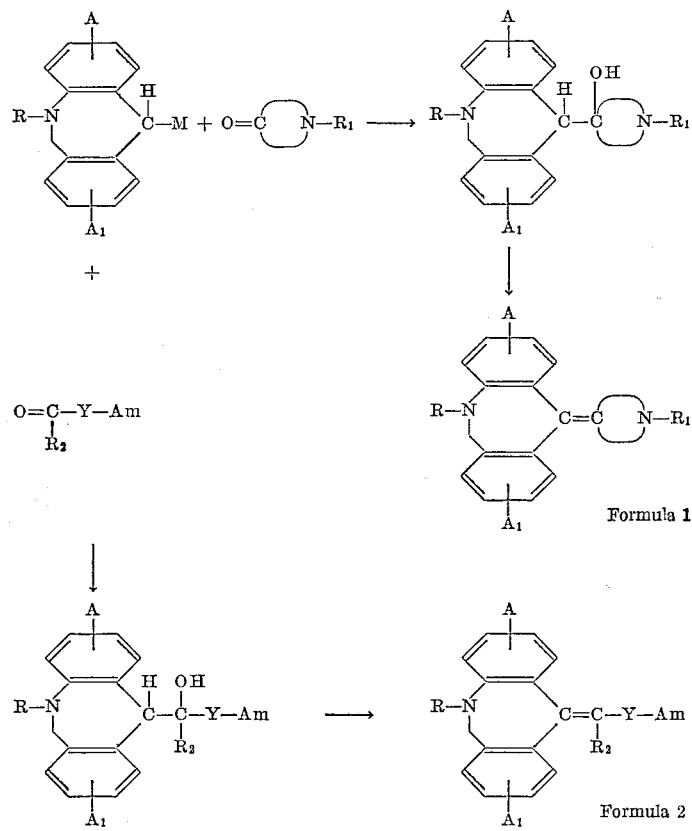

wherein M is an alkali metal such as lithium, A, $A_1$, R, $R_1$, $R_2$, Am and

have the assigned significance, and Am is not a primary or secondary amino group.

The 11-alkali metal salts of 5-substituted-5,6-dihydromorphanthridine used in the process are prepared by reacting a 5-substituted-5,6-dihydromorphanthridine with an alkali metal lower alkyl or aryl compound such as butyl lithium or phenyl lithium, advisably in about 10% excess. The reaction is readily effected by bringing the reactants together in an inert anhydrous liquid reaction medium such as pentane, hexane, ethyl ether, xylene, toluene, tetralin, cumene and tetrahydrofuran, and compatible mixtures of such solvents. The reaction can be effected at room temperature or elevated temperatures depending on the reactivity of the alkali metal compound used in the process. The reaction is substantially complete in 1 to 4 hours. Following termination of the reaction the product can be isolated, if desired, but this is ordinarily not done since it can be used as present in the reaction mixture.

Some of the N-substituted cyclicamino ketones which can be used in the process are N-substituted piperidones, pyrrolidones, and homopiperidones such as N-methyl-3-piperidone,
N-ethyl-4-piperidone,
N-methyl-3-pyrrolidone,
N-ethyl-3-pyrrolidone,
N-benzyl-3-piperidone,
N-benzyl-4-piperidone,
N-benzyl-3-pyrrolidone,
N-phenethyl-3-pyrrolidone,
N-cinnamyl-3-piperidone,
N-allyl-4-piperidone,
N-methyl-3-homopiperidone and
N-benzyl-4-homopiperidone.

The N-subsituted 2-piperidones, 2-pyrrolidones and 2-homopiperidones which are cyclic amides or lactams, are not suitable for use in the process.

Some of the amino aldehydes which can be used in the process are dimethylaminoacetaldehyde,
pyrrolidinoacetaldehyde,
N-methyl-4-piperazinopropionaldehyde, N-o-chlorobenzyl-N-methylaminobutyraldehyde,
N-p-methoxybenzyl-N-2-pyridylaminoacetaldehyde,
7-(N,N-diallylamino)-heptaldehyde,
8-(N-propargyl-N-methyl)-aminooctaldehyde,
morpholinoacetaldehyde,
isoindolinoacetaldehyde,
diphenylaminopropionaldehyde,
dibenzylaminobutyraldehyde,
5-(N-phenyl-N-ethylamino)-valeraldehyde,
8-morpholinocaprylaldehyde,
2-piperidylacetaldehyde,
3-piperidylacetaldehyde,
4-piperidylacetaldehyde,
2-pyrrolidylacetaldehyde,
3-pyrrolidylacetaldehyde,
3-homopiperidylacetaldehyde,
3-(3-piperidyl)-propionaldehyde,
4-(3-pyrrolidyl)-butyraldehyde,
2-pyridyl propionaldehyde,
4-pyridyl acetaldehyde and
4-pyridylaldehyde.

Representative of the aminoketones which can be used in the process are 2-pyridylmethyl methyl ketone,
3-acetyl pyridine,
3-propionylpyridine,
4-pyridylpropyl ethyl ketone,
N-methyl-2-piperidyl methylmethyl ketone,
N-benzyl-3-acetyl piperidine,
N-cinnamyl-3-propionyl piperidine,
N-ethyl-3-acetyl pyrrolidine,
N-allyl-2-pyrrolidyl acetone,
3-acetyl homopiperidine,
dimethylaminoethyl methyl ketone,
diethylaminomethyl phenyl ketone,
diphenylaminobutyl benzylketone,
dicyclohexylaminopropyl ethyl ketone,
piperidinopropyl benzyl ketone,
pyrrolidinoethyl methyl ketone,
4-methylpiperazinoethyl benzyl ketone,
3-quinuclidinylmethyl ketone and
N-phenyl-N-benzylaminopentyl methyl ketone.

The reaction between the N-substituted cyclicamino ketone or the aminoaldehyde or aminoketone and an 11-alkali metal salt of a 5-substituted-5,6-dihydromorphanthridine is readily effected by combining the reactants, advisably in equimolar amounts, in a suitable inert high boiling liquid reaction medium such as dioxane, toluene, xylene, ethyl ether, tetralin, cumene and tetrahydrofuran. The reaction mixture from the formation of the 11-alkali metal salt of the 5-substituted-5,6-dihydromorphanthridine can be used as the reactant and solvent source to which the appropriate ketone reactant can be added. The reaction proceeds at room temperature although slightly elevated temperatures can also be used. About 3 to 20 hours is generally adequate to substantially complete the reaction. After the reaction is terminated the product can be recovered by filtering the reaction mixture, distilling off the solvent and fractionally distilling the high boiling base in vacuo.

Some of the compounds which are produced by reaction with the N-substituted cyclicamino ketones according to this process are:

5-methyl-11-(N-methyl-4-hydroxy-4-piperidyl)-5,6-dihydromorphanthridine,
5-benzyl-11-(N-ethyl-3-hydroxy-3-piperidyl)-5,6-dihydromorphanthridine,
5-allyl-11-(N-benzyl-3-hydroxy-3-pyrrolidyl)-5,6-dihydromorphanthridine,
5-cinnamyl-11-(N-allyl-3-hydroxy-3-homopiperidyl)-5,6-dihydromorphanthridine, and
5-ethyl-11-(N-methyl-3-hydroxy-3-piperidyl)-5,6-dihydromorphanthridine.

Some of the novel intermediate 5-substituted-11-(alpha-hydroxyalkyl-amino)-5,6-dihydromorphanthridines produced by the described reaction are:

5-methyl-11-(1-hydroxy-2-dimethylaminoethyl)-5,6-dihydromorphanthridine,
5-benzyl-11-(1-hydroxy-1-methyl-2-piperidinoethyl)-5,6-dihydromorphanthridine,
2,9-dimethoxy-5-allyl-11-(1-hydroxy-1-benzyl-3-pyrrolidinopropyl)-5,6-dihydromorphanthridine,
5-cinnamyl-11-(1-hydroxy-1-allyl-3-homopiperidinopropyl)-5,6-dihydromorphanthridine,
2-chloro-5-ethyl-11(1-hydroxy-3-dibenzylaminopropyl)-5,6-dihydromorphanthridine,
5-propyl-11-(1-hydroxy-2-diethylaminoethyl)-5,6-dihydromorphanthridine,
2-trifluoromethyl-5-ethyl-11-[1-hydroxy-2-(N-ethyl-3-piperidyl)ethyl]-5,6-dihydromorphanthridine, and
5-methyl-11-[hydroxy-(N-methyl-2-pyrrolidyl)methyl]-5,6-dihydromorphanthridine.

These and other compounds of this invention can be converted to esters by conventional procedures. Of especial importance are those in which the acyl is a residue of a lower aliphatic carboxylic acid such as acetyl, propionyl and butyryl.

The 5-substituted-11-(alpha-hydroxyalkyl-amino)-5,6-dihydromorphanthridines and 5-substituted-11-(alpha-hydroxycyclicamino)-5,6-dihydromorphanthridines can be converted to esters of the formulae

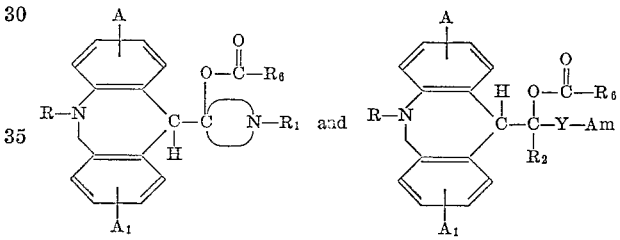

wherein $R_6$ represents a lower alkyl and particularly methyl, ethyl, isopropyl and butyl and A, $A_1$, R, $R_1$, $R_2$, Y and Am have the assigned significance. These esters can be readily produced by reacting a lower aliphatic carboxylic acid anhydride or an acyl halide with the 5-substituted-11-(alphahydroxy-alkylamino) - 5,6 - dihydromorphanthridines according to conventional ester formation reaction conditions. The acetate, propionate and butyrate esters of the compounds named above can be produced in this way.

The free hydroxy containing compounds, or esters thereof, having a cleavable or removable substituent on one or both of the nitrogens can be subjected to appropriate conditions such as reductive or hydrolytic cleavage to remove such groups. The trityl group is readily cleaved with a weak acidic solution, such as 50% acetic acid. In this way, 5-methyl-11-(N-trityl-4-hydroxy-4-piperidyl)-5,6-dihydromorphanthridine can be converted to 5-methyl-11-(4-hydroxy-4-piperidyl)-5,6-dihydromorphanthridine.

Other compounds which are produced in this way are 5-methyl-11-(3 - hydroxy - 3- piperidyl) - 5,6 - dihydromorphanthridine, 5-ethyl-11-(3-hydroxy-3-pyrrolidyl)-5,6-dihydromorphanthridine, 11 - (3 - hydroxy - 3 - homopiperidyl) - 5,6 - dihydromorphanthridine, and 11-(N-methyl - 4 - hydroxy - 4 - piperidyl) - 5,6 - dihydromorphanthridine, as well as the acetyl and propionyl esters thereof.

To effect the dehydration of the 11-(hydroxy-cyclicamino) - 5,6 - dihydromorphanthridines or 11 - (alphahydroxyalkyl - amino) - 5,6 - dihydromorphanthridines as well as those compounds containing substituents on the nitrogen in the 5-position and/or on the nitrogen of the cyclicamino group, it is advisable to have the hydroxy group present as an acyloxy derivative such as the acetate or other similar acyloxy derivative of a lower aliphatic monocarboxylic acid including the propionate or butyrate. Acid halides and anhydrides can be used to form the esters in conventional procedures. Dehydration of the resulting acyl derivative is achieved by pyrolysis through heating of the compound at an elevated temperature, such as 200°–500° C., to liberate the appropriate aliphatic acid. The residue can then be distilled under reduced pressure to obtain the 11-[(cyclicamino)ene] - 5,6 - dihydromorphanthridine or the 11-(alkylidene-amino) - 5,6 - dihydromorphanthridine.

Some of the compounds which are produced in this manner are:

5-methyl-11-(N-methyl-4-piperidylene)-5,6-dihydromorphanthridine,
5-phenthyl-11-(N-ethyl-3-piperidylene)-5,6-dihydromorphanthridine,
5-allyl-11-(N-cinnamyl-4-piperidylene)-5,6-dihydromorphanthridine,
5-methyl-11-(N-methyl-3-pyrrolidylene)5,6-dihydromorphanthridine,
5-benzyl-11-(N-ethyl-3-pyrrolidylene)-5,6-dihydromorphanthridine,
5-cinnamyl-11-(N-allyl-3-piperidylene)-5,6-dihydromorphanthridine,
11-(N-methyl-4-piperidylene)-5,6-dihydromorphanthridine,
5-methyl-11-(3-piperidylene)-5,6-dihydromorphanthridine,
5-ethyl-11-(3-pyrrolidylene)5,6-dihydromorphanthridine,
5-phenethyl-11-(3-homopiperidylene)-5,6-dihydromorphanthridine,
11-(4-piperidylene)-5,6-dihydromorphanthridine,
5-methyl-11-(2-dimethylaminoethylidene)-5,6-dihydromorphanthridine,
5-benzyl-11-(1-methyl-2-piperidinoethylidene)-5,6-dihydromorphanthridine,
2-chloro-5-methyl-11-(3-dimethylaminopropylidene)-5,6-dihydromorphanthridine,
5-allyl-11-(1-benzyl-3-pyrrolidinopropylidene)-5,6-dihydromorphanthridine,
2-chloro-5-methyl-11-(2-methyl-3-dimethylaminopropylidene)-5,6-dihydromorphanthridine,
5-methyl-11-[3-(N-methyl-N-benzylamino)-propylidene]-5,6-dihydromorphanthridine,
5-methyl-11-(3-N-methylaminopropylidene)-5,6-dihydromorphanthridine,
5-methyl-11-[3-(N-methyl-N-benzylamino)-2-methylpropylidene]-5,6-dihydromorphanthridine,
5-methyl-11-(3-N-methylamino-2-methylpropylidene)-5,6-dihydromorphanthridine,
5,6-dihydromorphanthridine,
5-methyl-11-[3-(4-methylpiperazino)-propylidene]-5,6-dihydromorphanthridine.
5-cinnamyl-11-(1-allyl-3-homopiperidinopropylidene)-5,6-dihydromorphanthridine,
5-ethyl-11-(3-dibenzylaminopropylidene)-5,6-dihydromorphanthridine,
5-propyl-11-(2-diethylaminoethylidene)-5,6-dihydromorphanthridine,
5-methyl-11-(2-methyl-3-dimethylaminopropylidene)-5,6-dihydromorphanthridine,
5-methyl-11-(3-dimethylaminobutylidene)-5,6-dihydromorphanthridine,
5-ethyl-11-[2-(N-ethyl-3-piperidyl)-ethylidene]-5,6-dihydromorphanthridine, and
5-methyl-11-[(N-methyl-2-pyrrolidyl)-methylidene]-5,6-dihydromorphanthridine.

It has also been discovered according to this invention that the 5,6-dihydromorphanthridines of Formula 1 and Formula 2

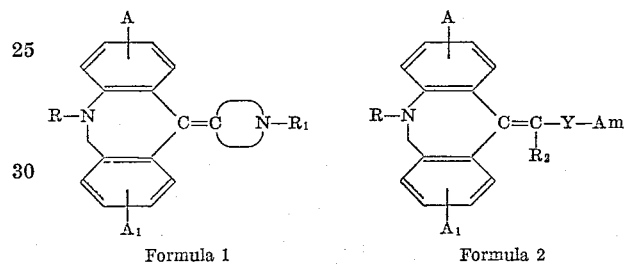

Formula 1    Formula 2 wherein A, $A_1$, R, $R_1$, $R_2$, Y and Am have the significance previously assigned, can be produced by reacting a 5-substituted-5,6-dihydro-11-morphanthridone with an N-substituted cyclicamino metal or metal halide or with a disubstituted aminoalkyl metal or metal halide to produce an 11-(N-substituted-hydroxy-cyclicamino)-5-substituted-5,6-dihydromorphanthridine or an 11-hydroxy-11-(disubstituted aminoalkyl) - 5 - substituted-5,6-dihydromorphanthridine which upon dehydration yields an 11-[(N-substituted - cyclicamino) - ene] - 5 - substituted - 5,6 - dihydromorphanthridine or an 11-(disubstituted aminoalkylidene)-5 - substituted - 5,6 - dihydromorphanthridine. This process can be represented as follows:

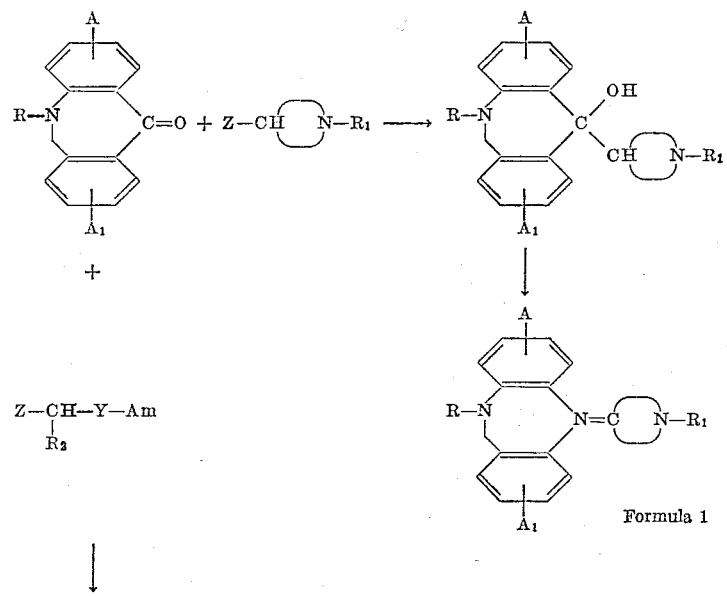

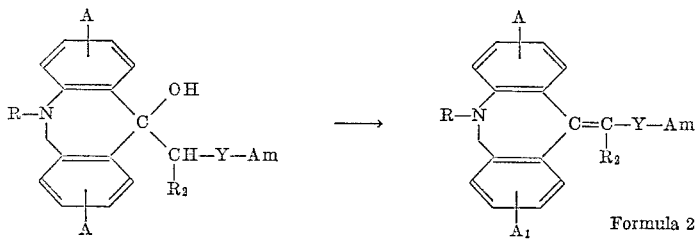

Formula 2 wherein Z is lithium or the group X—M— in which X is a reactive halogen and M is a reactive metal such as magnesium and A, A₁, R, R₁, R₂, Y and Am have the significance previously assigned but Am is not a primary or secondary amino group and R is not hydrogen.

Some of the 5-substituted-5,6-dihydro-11-morphanthridones which can be used in the process are:

5-methyl-5,6-dihydro-11-morphanthridone,
2-chloro-5-methyl-5,6-dihydro-11-morphanthridone,
2-chloro-5-ethyl-5,6-dihydro-11-morphanthridone,
2-trifluoromethyl-5-methyl-5,6-dihydro-11-morphanthridone,
9-chloro-5-ethyl-5,6-dihydro-11-morphanthridone,
3-methyl-5-benzyl-5,6-dihydro-11-morphanthridone,
5-allyl-5,6-dihydro-11-morphanthridone,
5-cinnamyl-5,6-dihydro-11-morphanthridone, and
5-phenethyl-5,6-dihydro-11-morphanthridone.

5-methyl-5,6-dihydro-11-morphanthridone is reported in Liebigs Annalen der Chemie 594, 89 (1955), and other such 5-substituted compounds can be produced as described there. The preparation of this compound by a different route is also illustrated in the examples infra. Of course, other similar compounds can be produced by the same process as is more fully described hereinafter.

Representative of the disubstituted aminoalkyl metal halides which can be used in the process are:

dimethylaminopropyl magnesium chloride,
diethylaminobutyl magnesium bromide,
dibenzylaminopropyl lithium,
diallylaminoisopropyl magnesium chloride,
N-methyl-N-benzylaminopropyl magnesium chloride,
di-phenethylaminopropyl magnesium chloride,
di-cinnamylaminopropyl magnesium chloride,
pyrrolidinobutyl magnesium chloride,
homopiperidinopropyl magnesium chloride, and
piperidinomethyl magnesium chloride.

The disubstituted aminoalkyl metal halides used in the first step are Grignard reagents which are produced by conventional methods such as disclosed in U.S. Patent 2,996,503 and German Patent 1,109,166.

Some of the N-substituted cyclicamino metal halides which can be used in this process are N-substituted piperidyl metal halides, N-substituted pyrrolidyl metal halides and N-substituted homopiperidyl metal halides such as N-methyl-3-piperidyl magnesium chloride,
N-ethyl-4-piperidyl lithium,
N-methyl-3-pyrrolidyl magnesium chloride,
N-ethyl-3-pyrrolidyl lithium,
N-benzyl-3-piperidyl magnesium chloride,
N-benzyl-4-piperidyl magnesium chloride,
N-benzyl-3-pyrrolidyl magnesium chloride,
N-phenethyl-3-pyrrolidyl magnesium chloride,
N-cinnamyl-3-piperidyl magnesium chloride,
N-allyl-4-piperidyl magnesium chloride,
N-methyl-3-homopiperidyl magnesium chloride, and
N-benzyl-4-homopiperidyl magnesium chloride.

Reaction between the N-substituted cyclicamino metal halide or the disubstituted aminoalkyl metal halide and the 5-substituted-5,6-dihydro-11-morphanthridone is conveniently effected by bringing the reactants together in admixture under conditions generally used for reacting a Grignard reagent with a ketone to form a tertiary alcohol. The reactants are advisably combined in an anhydrous ether such as ethyl ether, tetrahydrofuran or ethyl ether with benzene. After the reactants have been brought together the mixture can be heated such as at reflux to promote the reaction. After the reaction is terminated water is added to the reaction mixture to hydrolyze the Grignard adduct to the desired tertiary alcohol. The resulting product can then be isolated from the mixture such as by evaporating the solvent. The product can then be recrystallized from a suitable medium, such as benzene, if desired.

The same conditions can be used when an N-substituted cyclicamino lithium or a disubstituted aminoalkyl lithium is employed in the reaction.

Examples of some of the 11-hydroxy-11-(N-substituted cyclicamino) - 5 - substituted - 5,6 - dihydromorphanthridines which may be produced in this manner are:

11-hydroxy-11-(N-methyl-4-piperidyl)-5-methyl-5,6-dihydromorphanthridine,
11-hydroxy-11-(N-ethyl-3-piperidyl)-5-benzyl-5,6-dihydromorphanthridine,
11-hydroxy-11-(N-benzyl-3-pyrrolidyl)-5-allyl-5,6-dihydromorphanthridine,
11-hydroxy-11-(N-allyl-3-homopiperidyl)-5-cinnamyl-5,6-dihydromorphanthridine, and
11-hydroxy-11-(N-methyl-3-piperidyl)-5-ethyl-5,6-dihydromorphanthridine.

Some of the 11-hydroxy-11-(disubstituted aminoalkyl)-5-substituted-5,6-dihydromorphanthridines which are produced as described are:

11-hydroxy-11-(3-dimethylaminopropyl)-5-methyl-5,6-dihydromorphanthridine,
2-chloro-11-hydroxy-11-(3-dimethylaminopropyl)-5-methyl-5,6-dihydromorphanthridine,
11-hydroxy-11-(2-diethylaminopropyl)5-ethyl-5,6-dihydromorphanthridine,
2-chloro-11-hydroxy-11-(3-dimethylamino-2-methylpropyl)-5-methyl-5,6-dihydromorphanthridine,
11-hydroxy-11-(diallylaminopropyl)-5-allyl-5,6-dihydromorphanthridine,
11-hydroxy-11-(3-dibenzylaminopropyl)-5-benzyl-5,6-dihydromorphanthridine,
11-hydroxy-11-(3-piperidinopropyl)-5-methyl-5,6-dihydromorphanthridine,
11-hydroxy-11-(2-pyrrolidinoethyl)-5-ethyl-5,6-dihydromorphanthridine,
11-hydroxy-11-(3-dicyclohexylaminopropyl)-5-benzyl-5,6-dihydromorphanthridine,
5-methyl-11-hydroxy-11-[3-(N-methyl-N-benzylamino)propyl]-5,6-dihydromorphanthridine,
5-methyl-11-hydroxy-11-[3-((N-methyl-N-benzylamino)-

2-methylpropyl]-5,6-dihydromorphanthridine, and
5-methyl-11-hydroxy-11-[3-(N-methylpiperazino)-
propyl]-5,6-dihydromorphanthridine.

The compounds where R is hydrogen are produced by cleavage of appropriate groups as previously described.

The 11 - (N - substituted-hydroxy-cyclicamino) - 5-substituted-5,6-dihydromorphanthridines and the 11-hydroxy - 11 - (disubstituted aminoalkyl) - 5 - substituted-5,6-dihydromorphanthridines can be treated with a variety of dehydrating agents to form the 11-[(N-substituted cyclicamino)-ene] - 5 - substituted - 5,6 - dihydromorphanthridines and the 11 - (disubstituted-amino-alkylidene) - 5 - substituted - 5,6 - dihydromorphanthridines. Some of the dehydrating agents which can be used are acetyl chloride, thionyl chloride, acetic anhydride, potassium bisulfate and concentrated hydrochloric acid. Solvents that are useful when acetyl chloride or a similar dehydrating agent is employed are chloroform and methylene chloride. Reflux of the reaction mixture promotes reaction. The dehydration is usually essentially complete in an hour. Evaporation of the solvent and isolation by conventional techniques gives a solid of good purity.

Such a dehydration reaction gives the resulting product in far greater yield and greater ease than the pyrolysis reaction that is necessary when the hydroxy group is on the carbon alpha to the 11-position carbon in the morphanthridine group.

By following the described procedures there can be produced the 11 - [(N - substituted cyclicamino)-ene]-5-substituted - 5,6 - dihydromorphanthridines and the 11-(disubstituted aminoalkylidene) - 5 - substituted - 5,6-dihydromorphanthridines such as previously named.

It has also been discovered according to the present invention that the 5-substituted-5,6-dihydro-11-morphanthridones can be produced in good yields by reacting a 6,11(5H)-morphanthridinedione with a ketal forming agent to form a 6,11-(5H)-morphanthridinedione-11-ketal, reacting said compound with an alkali metal salt with a suitable alkylating agent to form a 5-substituted-6,11-morphanthridinedione-11-ketal, reducing the 6-keto group in such compound to form a 5-substituted-5,6-dihydro-11-morphanthridone-11-ketal, and hydrolyzing said ketal to form a 5 - substituted-5,6-dihydro-11-morphanthridone. This process can be represented as follows:

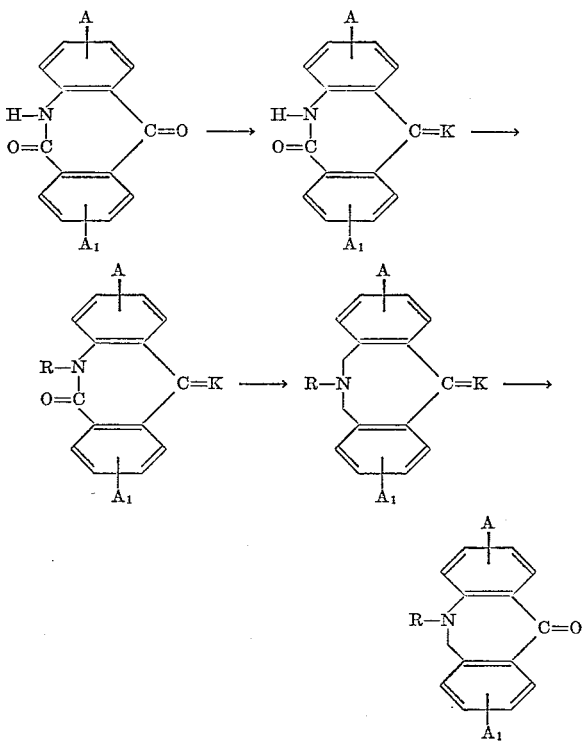

wherein A, $A_1$ and R have the significance previously assigned but R is not hydrogen in these formulas, and K represents two identical lower alkoxy groups such as methoxy or ethoxy or a lower alkylenedioxy group such as ethylenedioxy or propylenedioxy, thereby forming a ketal.

Representative 6,11(5H)-morphanthridinedione starting materials for use in this process are disclosed in U.S. Patent 2,973,354, French Patent 1,216,631, German Patent 837,537 and British Patent 701,789.

Conversion of the 6,11(5H)-morphanthridinedione to the corresponding 11-ketal can be readily effected by bringing the 6,11(5H)-morphanthridinedione and a lower alcohol or a lower glycol together in admixture in the presence of a suitable acidic catalyst such as p-toluene sulfonic acid, sulfuric acid, phosphoric acid and hydrochloric acid. The ketalization can be effected from ambient temperature to 200° C. The reflux temperature is generally preferred. An excess of the alcohol or glycol can be used as the reaction medium although other liquid mediums such as benzene, toluene or xylene can be used. After the ketalization reaction is terminated the reaction mixture can be cooled, neutralized and the desired product isolated by conventional procedures.

Some of the ketals that are produced as described are:

6,11(5H)-morphanthridinedione-11-ethylene ketal,
2-chloro-6,11(5H)-morphanthridinedione-11-ethylene ketal,
6,11(5H)-morphanthridinedione-11-propylene ketal,
6,11(5H)-morphanthridinedione-11-dimethyl ketal, and
6,11(5H)-morphanthridinedione-11-diethyl ketal.

The addition of a 5-substituent to the 6,11(5H)-morphanthridinedione-11-ketals is readily effected by the use of a suitable alkylating agent such as a lower alkyl halide including methyl chloride, methyl iodide, ethyl bromide, a phenyl-lower alkyl halide such as benzylchloride and phenethylchloride or a lower alkenyl halide such as allylbromide. Instead of the halides, one can also use the corresponding tosylates, i.e., methyl tosylate and the like. The 6,11(5H)-morphanthridinedione-11-ketal is advisably used in the form of an alkali metal salt thereof, e.g., lithium, sodium or potassium salt. These salts are prepared by reacting a 6,11(5H)-morphanthridinedione-11-ketal with (a) an alkali metal in the presence of toluene or xylene, (b) an alkali metal aryl compound such as phenyl lithium, (c) a sodium or potassium lower alkoxide such as the methoxide, ethoxide or butoxide, (d) an alkali metal in the presence of ammonia, (e) lithium or potassium amide, or (f) a lithium, sodium or potassium hydride.

The reaction is conveniently achieved by bringing the 6,11(5H)-morphanthridinedione-11-ketal, alkylating agent and condensing agent together in an inert liquid reaction medium such as toluene, xylene and benzene. The reaction is promoted by heating the mixture, such as at the reflux temperature. After the reaction is terminated water can be added to the mixture to decompose any excess condensing agent, the organic layer separated and the product isolated by conventional manipulative techniques.

Representative of the products formed as described are:

5-methyl-6,11-morphanthridinedione-11-ethylene ketal,
2-chloro-5-methyl-6,11-morphanthridinedione-11-ethylene ketal,
5-ethyl-6,11-morphanthridinedione-11-ethylene ketal,
5-trityl-6,11-morphanthridinedione-11-propylene ketal,
5-benzyl-6,11-morphanthridinedione-11-ethylene ketal,
5-phenylethyl-11-dimethoxy-6,11-morphanthridine, and
5-allyl-11-diethoxy-6,11-morphanthridine.

The 6-keto group of the 5-substituted-6,11-morphanthridinedione-11-ketals can be reduced by reacting it with lithium aluminum hydride in a suitable reaction medium such as tetrahydrofuran, diethylether or dibutylether. Reflux temperature is highly suitable for promoting the reaction. The reaction is substantially completed in a few hours. The product can be isolated by adding water to the reaction mixture to decompose unreacted lithium aluminum hydride, separating the organic layer and drying it and evaporating to dryness.

Some of the 5-substituted-5,6-dihydro-11-morphanthridones-11-ketals which can be produced as described are:

5-methyl-5,6-dihydro-11-morphanthridone-11-ethylene ketal, 2-chloro-5-methyl-5,6-dihydro-11-morphanthridone-11-ethylene ketal, 5-ethyl-5,6-dihydro-11-morphanthridone-11-propylene ketal, 5-benzyl-5,6-dihydro-11-morphanthridone-11-dimethyl ketal, and 5-allyl-5,6-dihydro-11-morphanthridone-11-diethyl ketal.

Hydrolysis of such ketals with a mineral acid such as hydrochloric acid in a suitable liquid reaction medium such as water or aqueous organic solvent mixtures containing an organic solvent such as ethanol, methanol, isopropanol and dioxane at a temperature of about 0° C. to 100° C. gives the desired 11-keto compounds such as named herein previously.

Those compounds of Formula 2 wherein Am is

and $R_3$ and/or $R_4$ are benzyl, can be converted to the corresponding compounds in which $R_3$ or $R_4$ is hydrogen by debenzylation using a chloroformic acid ester or chlorothioformic acid ester to form an intermediate carbamate and then hydrolyzing to cleave the acyloxy group. This process, as applied to some of the compounds of this invention, can be represented as follows:

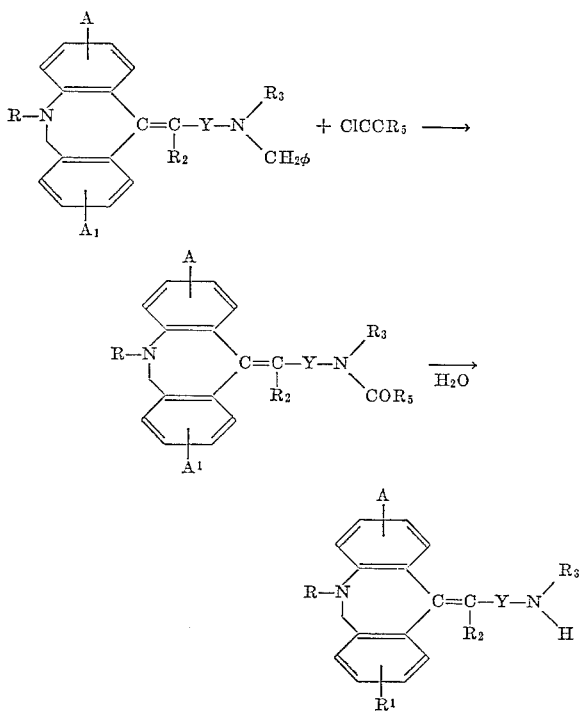

wherein A, $A_1$, Y, R, $R_2$ and $R_3$ have the assigned meaning but R is not benzyl and $R_3$ is not hydrogen and $R_5$ is a lower alkoxy such as methoxy and ethoxy, a lower thioalkyl such as thiomethyl, thioethyl and thiopropyl, phenoxy and thiophenyl. Benzyl groups represented by R can also be cleaved in this manner. The J. Org. Chem. 26, 4057 (1961), illustrates other applications of the process.

Among the chloroformates which can be used in the first step of the process are methyl chloroformate, ethyl chloroformate, phenyl chloroformate, methylthiochloroformate, ethylthiochloroformate and phenylthiochloroformate.

The debenzylation reaction is readily effected by bringing the reactants together in a suitable inert solvent at from room temperature to about 200° C. Benzene is a particularly useful reaction medium and with it a reaction temperature of about 80° C. is suitable. Preferably, the reaction mixture is refluxed for about 5 to 20 hours before reaction is terminated. The intermediate carbamate is isolated from the reaction mixture by conventional methods.

Some of the intermediate carbamates formed in this manner are:

5-methyl-11-{3-[N-methyl-N-(S-ethylthiocarbonyl)-amino]-2-methylpropylidene}-5,6-dihydromorphanthridine, 5-methyl-11-[3-(N-methyl-N-carbethoxyamino)propylidene]-5,6-dihydromorphanthridine, and 5-methyl-11-{3-[N-methyl-N-(S-methylthiocarbonyl)-amino]-propylidene}-5,6-dihydromorphanthridine.

The carboxy group can be cleaved by acid or base hydrolysis and preferably with a base such as barium, calcium, lithium, sodium or potassium hydroxide or an acid such as acetic acid, hydrobromic acid, hydrochloric acid or p-toluene-sulfonic acid. The rate of hydrolysis is increased by heating the hydrolysis mixture, such as at reflux. Following the hydrolysis the reaction mixture can be neutralized and the product extracted.

Typical of the compounds produced by the hydrolysis of the carboxy group are 5-methyl-11-(3-N-methylaminopropylidene)-5,6-dihydromorphanthridine and 5-methyl-11-(3-N-methylamino-2-methylpropylidene)-5,6-dihydromorphanthridine.

The compounds of this invention form water soluble acid addition salts with inorganic and organic acids such as hydrochloric acid, hydrobromic acid, sulphuric acid, phosphoric acid, methane sulphonic acid, ethane disulphonic acid, acetic acid, nitric acid, maleic acid, succinic acid, tartaric acid, benzoic acid, phthalic acid and cyclohexyl sulfamic acid.

The compounds also form lower alkyl quaternary ammonium salts such as methyl chloride, ethyl bromide and diethyl sulfate.

The compounds of this invention, and especially those of Formulae 1 and 2, other than the intermediate alkali metal salts, have anticholinergic and analgetic activity. They thus can be used in pharmacological studies and as screening agents for evaluating compounds for these activities. In addition, these compounds have antispasmodic, antidepressant and tranquilizing effects. The compounds are antipsychotic, antianxiety, mood elevating and mood leveling agents. They are skeletal muscle relaxants and also reduce aggressiveness. For the described uses in animals the bases or acid addition salts would be used except that quaternary ammonium salts would be used for anticholinergic activity. Actual use in animals, including humans, for the described purposes is indicated. They can also be used as neutralizing agents and in purifying penicillin with which they form salts.

The compounds can be administered to animals as pure compounds as the bases or in the form of a pharmaceutically acceptable nontoxic acid addition salt, but to obtain a more practical size to dosage relationship one or more of the compounds is combined with a suitable pharmaceutical carrier and made into unit-dosage forms. Administration can be oral or parenteral.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the compounds and can be administered one or more at a time at regular intervals. Such unit dosage forms can contain 1 to 300 mg. or more of an active compound of this invention. The total amount of active compound administered must be ultimately fixed by reference to the animal and disease to be treated. However, about 1 to 300 mg. four times daily for a total daily dose of 4 to 1200 mg. is suitable.

The presently most interesting compound as an antidepressant, tranquilizer, antipsychotic agent, mood elevator and skeletal muscle relaxant is 5-methyl-11-(3-dimethylamino-propylidene)-5,6-dihydromorphanthridine as the base or an acid addition salt.

A typical tablet can have the composition:

|  | Mg. |
|---|---|
| 5-methyl-11-(3 - dimethylaminopropylidene) - 5,6-dihydromorphanthridine | 10 |
| Lactose | 136.5 |
| Corn starch | 20 |
| Corn starch (as 10% starch paste) | 3.4 |
| Magnesium stearate | 1.3 |

A ⁵⁄₁₆ inch diameter standard concave punch is used to compress the composition into a tablet.

The following examples are presented to illustrate the invention:

EXAMPLE 1

5-methyl-11-(1-methyl-4-hydroxy-4-piperidyl)-5,6-dihydromorphanthridine

A stirred solution of 66.4 g. (0.318 mole) of 5-methyl-5,6-dihydromorphanthridine in 380 cc. of tetrahydrofuran was covered with nitrogen, cooled in ice water and treated with a solution of 206 cc. (0.353 mole) of commercial butyl-lithium solution in 290 cc. of ether over a period of 25 minutes. The dark brown solution was stirred at room temperature for 6 hours after which time there was added in 1 hour at room temperature a solution of 35.9 g. (0.318 mole) of N-methyl-4-piperidone in 118 cc. of ether. After stirring for an additional 8 hours, 200 cc. of water was added. The organic layer was separated, washed once with 100 cc. of water and dried over calcium sulfate. After removal of the solvent, the residue was distilled yielding a forerun of 44.9 g. of 5-methyl-5,6-dihydromorphanthridine and the desired product, 24.5 g. (24% or 74% based on nonrecovered N-methyl-5,6-dihydromorphanthridine), B.P. 200–220° C. (0.15 mm.).

*Analysis.*—Calcd. for $C_{21}H_{26}N_2O$: N, 8.69. Found: N, 8.13.

Redistillation of the base afforded a fraction, B.P. 210–220° C. (0.6 mm.) which could be crystallized from acetonitrile. The product obtained after several recrystallizations had a M.P. 152–153° C.

*Analysis.*—Calcd. for $C_{21}H_{26}N_2O$: N, 8.69. Found: N, 8.45.

EXAMPLE 2

5-methyl-11-(N-methyl-4-acetoxy-4-piperidyl)-5,6-dihydromorphanthridine

To a solution of 27 g. (0.0837 mole) of 5-methyl-11-(N - methyl - 4 - hydroxy - 4 - piperidyl) - 5,6 - dihydromorphanthridine in 500 cc. of acetic anhydride was added 19 g. of toluenesulfonic acid. After keeping the mixture at 100° C. for 5 hours, the excess acetic anhydride was removed by distillation. Dilute sodium hydroxide was added and the dark material was extracted with benzene, washed with water and dried over calcium sulfate. After removal of the benzene, 18 g. of crude acetate was obtained, identified by its infrared spectrum which showed a carbonyl absorption band at 5.8μ and a carbon-oxygen stretch band at 8.08μ.

EXAMPLE 3

5-methyl-11-(N-methyl-4-piperidylene)-5,6-dihydromorphanthridine

The 18 g. of crude ester from Example 2 was pyrolized by heating in an oil bath at 210° C. for ¾ hour during which acetic acid was liberated. Distillation of the residue afforded a fraction, 8.1 g., B.P. 180–200° C. (0.05 mm.).

*Analysis.*—Calcd. for $C_{21}H_{24}N_2$: N, 9.20. Found: N, 8.98.

EXAMPLE 4

6,11(5H)-morphanthridinedione-11-ethylene ketal

A mixture of 44.6 g. (0.2 mole) of 6,11(5H)-morphanthridinedione, 1250 cc. of ethylene glycol and 0.9 g. of p-toluene-sulfonic acid were stirred and heated to reflux. Approximately 250 cc. of distillate was collected dropwise over a period of ca. 3 hours. The mixture was then cooled, the acid was neutralized by the addition of an equivalent amount of alcoholic sodium ethylate and the recation mixture was poured with stirring into 5 liters of water. The solid was collected by filtration, rinsed with water, air-dried and recrystallized from 360 cc. of ethylacetate to give 24 g. of the ketal, M.P. 223–224° C.

*Analysis.*—Calcd. for $C_{16}H_{13}NO_3$: C, 71.90; H, 4.94; N, 5.24. Found: C, 71.53; H, 4.84; N, 5.28.

EXAMPLE 5

5-methyl-6,11-morphanthridinedione-11-ethylene ketal

To a solution of 18.7 g. (0.07 mole) of 6,11(5H)-morphanthridinedione-11-ethylene ketal in 350 cc. of toluene and 100 cc. of dioxane was added a slurry of 2.72 g. (0.07 mole) of sodamide in 100 cc. of toluene. After a 3 hours reflux period, the mixture was cooled and a solution of 28.4 g. (0.2 mole) of methyliodide in 50 cc. of toluene was added in 0.5 hour. The mixture was then stirred 12 hours at ambient temperature followed by 24 hours of stirring at reflux temperature. Water (15 cc.) was added to the cooled reaction mixture, the organic layer was separated and concentrated after drying over potassium carbonate. There was obtained 14.3 g. product, M.P. 175–178° C. A sample, purified by sublimation, had a M.P. of 183–185° C.

EXAMPLE 6

5-methyl-5,6-dihydro-11-morphanthridone-11-ethylene ketal and 5-methyl-5,6-dihydro-11-morphanthridone A solution of 20 g. (0.07 mole) of 5-methyl-6,11(5H)-morphanthridinedione-11-ethylene ketal in 250 cc. of tetrahydrofuran (T.H.F.) was added dropwise to a stirred slurry of 2.7 g. of lithium aluminum hydride in 150 cc. of T.H.F. After a 5.5 hour reflux period the cooled mixture was decomposed by dropwise addition of 25 cc. of water, the organic layer was separated, dried over potassium carbonate, filtered and taken to dryness to leave 28.3 g. of 5-methyl-11-morphanthridone-11-ethylene ketal as a very viscous oil. The oil was dissolved in 195 cc. of 85% aqueous ethanol, 15 cc. of HCl (38%) was added and the solution was heated for 2 hours on a steambath, cooled and poured into 1 liter of water. The solid was collected by filtration and recrystallized from methanol to give 8.2 g. product, M.P. 108–110° C. A resublimed sample melted at 115° C.

EXAMPLE 7

2-chloro-6,11(5H)-morphanthridinedione-11-ethylene ketal

A slurry of 222 g. (0.86 mole) of 2-chloro-6,11(5H)-morphanthridinedione in 2340 ml. of ethylene glycol was heated to 180° C. whereupon a clear solution was obtained. Heating was continued and 1.1 liter of distillate was collected. The reaction mixture was cooled to 60° C. and a sodium ethylate solution (obtained from 0.56 g. of sodium and 50 ml. of ethanol) was added. The basic solution was poured into 5 liters of water which was extracted with dichloromethane. A solid precipitated out of the dichloromethane which was collected and recrystallized from p-dioxane to yield 10 g. of starting material. The dichloromethane solution was washed with water, dried, taken to dryness in vacuo, and recrystallized from p-dioxane to yield 101 g. of product, M.P. 264–269° C. Reduction of both mother liquor and subsequent recrystallizations yielded an additional 37 g. of product which was combined with the first batch to yield 138 g. (53.2%), M.P. 262–273° C.

*Analysis.*—Calcd. for $C_{16}H_{12}ClNO_3$: C, 63.69; H, 4.01; Cl, 11.78; N, 4.64. Found: C, 63.73; H, 3.94; Cl, 11.78; N, 4.49.

EXAMPLE 8

2-chloro-5-methyl-6,11-morphanthridinedione-11-ethylene ketal

A slurry of 18.7 g. (0.48 mole) of sodium amide in 300 ml. of anhydrous toluene was added to a solution of 137.8 g. (0.457 mole) of 2-chloro-6,11(5H)-morphanthridinedione-11-ethylene ketal in 1700 ml. of anhydrous toluene and 500 ml. of p-dioxane and refluxed for 5.5 hours. The solution was cooled to room temperature and 142 g. (1.0 mole) of methyl iodide in 200 ml. of anhydrous toluene added dropwise. The solution was then stirred at room temperature overnight, refluxed 7 hours and cooled to room temperature. Water (90 ml.) was added dropwise and the solution stirred 0.3 hour at room temperature. The organic layer was separated, washed with water, dried, taken to dryness in vacuo to yield a mixture of unreacted and methylated ketal. The procedure was repeated on a 60% basis, to yield a solid which was crystallized from ethyl alcohol to yield 118.4 g. (82%), M.P. 173–176° C.

*Analysis.*—Calcd. for $C_{17}H_{14}ClNO_3$: C, 64.66; H, 4.47; N, 4.43; Cl, 11.24. Found: C, 64.56; H, 4.51; N, 4.47; Cl, 11.29.

EXAMPLE 9

2-chloro-5-methyl-5,6-dihydro-11-morphanthridone-11-ethylene ketal

A solution of 47.3 g. (0.15 mole) of 2-chloro-5-methyl - 6,11 - morphanthridinedione - 11 - ethylene ketal in 250 ml. of tetrahydrofuran was added dropwise to a stirred slurry of 5.5 g. of lithium aluminum hydride in 160 ml. of tetrahydrofuran. The mixture was stirred and refluxed for twenty-four hours, cooled, and the addition complex was decomposed by dropwise addition of 31 ml. of water. The inorganic salts were removed by filtration and the filtrate was concentrated to give 42 g. of a glass-like residue. This residue (40 g.) was recrystallized from 500 ml. of hot isopropanol to give 26.5 g. (61.5%) of a crystalline product, M.P. 127–130° C. The melting point could be raised to 131.5–132° C. by repeated crystallizations from ethanol.

*Analysis.*—Calcd. for $C_{17}H_{16}ClNO_2$: C, 67.67; H, 5.35; N, 4.64; Cl, 11.75. Found: C, 67.53; H, 5.22; N, 4.66; Cl, 11.55.

EXAMPLE 10

2-chloro-5-methyl-5,6-dihydro-11-morphanthridone 2-chloro - 5 - methyl - 5,6 - dihydro - 11 - morphanthridone - 11 - ethylene ketal (55.7 g., 0.185 mole) was dissolved in a solution of 650 ml. of alcohol and 40 ml. of water. With cooling 41 ml. of concentrated hydrochloric acid was then added dropwise after which an additional 45 ml. of water was added. The reaction mixture was then refluxed 2.5 hours, cooled to room temperature, poured into 1 liter of 1 N sodium hydroxide and diluted to a volume of 3 liter with water. The resulting solid was removed by filtration, dried partially and recrystallized from alcohol to 38.0 g. (80%, M.P. 121–123.5° C.

*Analysis.*—Calcd. for $C_{15}H_{12}ClNO$: C, 69.91; H, 4.70; N, 5.44. Found: C, 69.99; H, 4.85; N, 5.42.

EXAMPLE 11

5-methyl-11-hydroxy-11-(3-dimethylaminopropyl)-5,6-dihydromorphanthridine

A flask was charged with 1.9 g. (0.078 atom) of magnesium turnings, 25 cc. of tetrahydrofuran (T.H.F.) and a trace of calcium hydride. The reaction was started by the addition of 1 g. of methyl iodide and a crystal of iodine. At reflux temperature a solution of 9.49 g. (0.078 mole) of 3 - dimethylaminopropyl chloride in 25 cc. of T.H.F. was added dropwise and the reaction mixture was stirred and refluxed for another hour. The solution was then cooled in ice water, and a solution of 8.9 g. (0.039 mole) of 5 - methyl - 5,6 - dihydro - 11 - morphanthridone in 75 cc. of T.H.F. was added dropwise. After stirring at ambient temperature for 18 hours, the T.H.F. was evaporated in vacuo at 50° C. and replaced by 75 cc. of benzene. The solution was then hydrolyzed in the cold by dropwise addition of 19.5 of water. The percipitate was filtered off and the filtrate was taken to dryness, giving 12 g. of brown residue which, after recrystallization from 55 cc. of ethanol, gave 7.6 g. compound, M.P. 135.5–134° C.

*Analysis.*—Calcd. for $C_{20}H_{26}N_2O$: C, 77.37; H, 8.44; N, 9.03. Found: C, 77.29; H, 8.46; N, 9.20.

EXAMPLE 12

5-methyl-11-(3-dimethylaminopropylidene)-5,6-dihydromorphanthridine

Into a solution of 6.3 g. (0.0203 mole) of 5-methyl-11 - hydroxy - 11 - (3-dimethylaminopropyl) - 5,6 - dihydromorphanthridine in 250 cc. of chloroform was passed dry hydrochloric acid until the pH reached 1. An orange oil separated. To this mixture was added a solution of 5.5 g. (0.07 mole) of acetyl chloride in 50 cc. of chloroform and the reaction mixture was stirred and heated on a steambath for 1 hour. The solution was taken to dryness and the residue was taken up in water, made alkaline with potassium hydroxide and extracted with ether. The ethereal solution was dried over potassium carbonate, filtered and taken to dryness to give 5.7 g. of crude base. This base was converted to the dicyclohexylsulfamate by dissolving it in 50 cc. of ethanol and 100 cc. of ether and adding a solution of 8.05 g. of cyclohexylsulfamic acid in 50 cc. of alcohol and 50 cc. of ether. Further addition of 150 cc. of ether caused the salt to crystallize, 11.4 g., M.P. 138–139° C.

*Analysis.*—Calcd. for $C_{32}H_{50}N_4O_6S_2$: N (non aqueous titration), 4.30; N, 8.61; C, 59.04; H, 7.74. Found: N (non aqueous titration), 4.23; N, 8.59; C, 58.50; H. 8.05.

EXAMPLE 13

2-chloro-5-methyl-11-hydroxy-11-(3-dimethylaminopropyl)-5,6-dihydromorphanthridine To a Grignard reagent prepared from 1.7 g. (0.07 atom) of magnesium and 8.5 g. (0.07 mole) of 1 - chloro-3-dimethylaminopropane in 100 ml. of tetrahydrofuran was added at room temperature a solution of 9.0 g. (0.035 mole) of 2 - chloro - 5 - methyl - 5,6 - dihydro-11-morphanthridone in 100 ml. of tetrahydrofuran. The solution was stirred for 24 hours at room temperature after which the complex was decomposed by addition of 13 ml. of saturated ammonium chloride solution. The inorganic salts were filtered off, the filtrate was dried and then taken to dryness in vacuo to yield a solid which was recrystallized from methanol to yield 8.2 g. (70%), M.P. 151–160° C.

*Analysis.*—Calcd. for $C_{20}H_{25}ClN_2O$: C, 69.64; H, 7.30; N, 8.12. Found: C, 69.48; H, 7.49; N, 8.06.

EXAMPLE 14

2-chloro-5-methyl-11-(3-dimethylaminopropylidene)-5,6-dihydromorphanthridine

Anhydrous hydrogen chloride was passed through a cooled solution of 10 g. (.029 mole) of 2-chloro-5- methyl - 11 - hydroxy-11-(3-dimethylaminopropyl) - 5,6-dihydromorphanthridine in 150 ml. of chloroform until pH 1. A solution of 7.9 g. (0.1 mole) of acetyl chloride in 50 ml. of chloroform was added dropwise and the solution was refluxed for 2 hours. The solvent was removed in vacuo, the residue dissolved in 150 ml. of water and extracted with ether. The aqueous solution was then made alkaline with potassium hydroxide, extracted with ether and the extracts combined and dried. The solvent was removed in vacuo to yield the crude base which was fractionated twice to yield 4.6 g. (40%), B.P. 200–210° C. (0.35 mm.).

The dihydrochloride salt was prepared by adding ethereal hydrochloric acid to a solution of the base in ether. The melting point was 183–186° C. after several crystallizations from ethanol-ether.

*Analysis.*—Calcd. for $C_{20}H_{25}Cl_3N_2$: C, 60.08; H, 6.30; N, 7.00. Found: C, 59.83; H, 6.53; N, 6.96.

EXAMPLE 15

2-chloro-5-methyl-11-hydroxy-11-(3-dimethylamino-2-methylpropyl)-5,6-dihydromorphanthridine To Grignard reagent prepared from 1.67 g. (0.69 atom) of magnesium and 9.3 g. (0.069 mole) of 1-chloro-2-methyl-3-dimethylaminopropane in 100 ml. of tetrahydrofuran was added at room temperature 9.0 g. (0.035 mole) of 2 - chloro - 5 - methyl-5,6-dihydro-11-morphanthridone in 50 ml. of tetrahydrofuran. The solution was stirred for 24 hours at room temperature after which the complex was decomposed by addition of 15 ml. of saturated ammonium chloride solution. The inorganic salts were filtered off and the filtrate was dried and taken to dryness in vacuo to yield a solid which was recrystallized from acetonitrile to yield 6.4 g. (51%), M.P. 188–197° C. Subsequent reductions of the mother liquor resulting in 4.2 g. (33%) of product, M.P. 153–169° C.

EXAMPLE 16

2-chloro-5-methyl-11-(3-dimethylamino-2-methylpropylidene)-5,6-dihydromorphanthridine Anhydrous hydrogen chloride was passed through a cooled solution of 10.6 g. (0.030 mole) of 2-chloro-5-methyl-11-hydroxy - 11 - (3-dimethylamino-2-methylpropyl)-5,6-dihydromorphanthridine in 150 ml. of chloroform until pH 1. A solution of 8.1 g. (0.1 mole) of acetyl chloride in 50 ml. of chloroform was added dropwise and the solution refluxed 2 hours. The solvent was removed in vacuo, the residue dissolved in 150 ml. of water and extracted with ether. The aqueous solution was then made alkaline with potassium hydroxide, extracted with ether and the extracts combined, and dried. The solvent was removed in vacuo to yield a syrup, which was fractionated two times to yield 8.2 g. (80%), B.P. 180–185° C. (0.6 mm.).

*Analysis.*—Calcd. for $C_{21}H_{25}ClN_2$: C, 73.98; H, 7.39; N, 8.22. Found: C, 74.05; H, 7.46; N, 8.00.

EXAMPLE 17

5-methyl-11-hydroxy-11-(3-N-methyl-N-benzylaminopropyl)-5,6-dihydromorphanthridine To a Grignard solution, prepared from 59.3 g. (0.3 mole) of 3 - (N - methyl - N-benzyl)amino-1-chloro propane, 7.3 g. (0.3 mole) of magnesium, and 200 ml. of tetrahydrofuran was added 33.4 g. (0.15 mole) of 5-methyl-5,6-dihydro-11-morphanthridone in 300 ml. of tetrahydrofuran at room temperature. The solution was stirred overnight and the complex was decomposed by the dropwise addition of 60 ml. of saturated ammonium chloride solution. The precipitate was filtered off, the filtrate was dried over potassium carbonate, filtered, and concentrated in vacuo to give 66 g. of the crude carbinol.

EXAMPLE 18

5-methyl-11-(3-N-methyl-N-benzylaminopropylidene)-5,6-dihydromorphanthridine

Into a solution of 66 g. of crude 5-methyl-11-hydroxy-11-[3-(N-methyl-N-benzylamino)propyl] - 5,6 - dihydromorphanthridine in 1 liter of chloroform was passed dry hydrochloric acid until the pH reached 1. A solution of 39 g. of acetyl chloride in 300 ml. of chloroform was added dropwise, the solution was refluxed for 2 hours and then concentrated, leaving a brown oil. This oil was dissolved in 2 liters of water, washed with ether, and the aqueous layer was made alkaline with potassium hydroxide. The resulting oil was extracted with ether, dried, and the ethereal solution was concentrated to give 41 g. of product.

EXAMPLE 19

5-methyl-11-{3-[N-methyl-N-(S-methylthiocarbonyl)amino]propylidene}-5,6-dihydromorphanthridine A mixture of 41 g. (0.122 mole) of 5-methyl-11-(3-N-methyl - N - benzylamino propylidene)-5,6-dihydromorphanthridine, 115 cc. of dry benzene and 13.5 g. (0.122 mole) of methylthiochloroformate was stirred and refluxed for twenty-four hours. The reaction mixture was distilled with steam and the residue taken up in benzene. The benzene solution was washed with aqueous potassium carbonate once, and once with water, dried over potassium carbonate, filtered, and concentrated to dryness leaving a brown oily residue of 35.7 g.

EXAMPLE 20

5-methyl-11-(3-N-methylaminopropylidene)-5,6-dihydromorphanthridine

A mixture of 28 g. (0.08 mole) of 5-methyl-11-{3-[N-methyl - N - (S-methylthiocarbonyl)amino]propylidene}-5,6-dihydromorphanthridine, 40 g. of barium hydroxide $8H_2O$ and 300 cc. of ethylene glycol was stirred and refluxed for nine hours. The mixture was poured into 2500 cc. of water. The solid was removed by filtration and rinsed with benzene. The filtrate was extracted with benzene and the combined benzene layers were extracted with dilute HCl. The aqueous extract was washed with ether, cooled, made alkaline with KOH and extracted with ether. The ethereal extracts were dried over potassium carbonate, filtered, and taken to dryness to leave 16.25 g. of a brown oil which on distillation gave 11.3 g. (50%) of product, B.P. 163–167° C./0.02 mm.

*Analysis.*—Calcd. for $C_{19}H_{22}N_2$: C, 81.98; H, 7.97; N, 10.06. Found: C, 81.87; H, 8.09; N, 9.80.

EXAMPLE 21

5-methyl-11-hydroxy-11-[3-(4-methyl-piperazino)-propyl]-5,6-dihydromorphanthridine To the Grignard reagent, prepared from 5.3 g. (0.22 atom) of magnesium and 38.5 g. (0.22 mole) of 1-methyl-4-(3-chloro)-propylpiperazine in 150 ml. of tetrafuran, was added at room temperature a solution of 24.4 g. (0.11 mole) of 5-methyl-5,6-dihydro-11-morphanthridone in 200 ml. of tetrahydrofuran. The mixture was stirred for 24 hours at room temperature, the complex decomposed by addition of 44 ml. of saturated ammonium chloride solution, the inorganic salts filtered off and the filtrate dried over potassium carbonate, filtered and concentrated in vacuo. The residue was recrystallized from isopropanol to give 22.9 g. (62.8%), M.P. 143–146.5° C.

*Analysis.*—Calcd. for $C_{23}H_{30}N_3O$: C, 75.79; H, 8.30; N, 11.53. Found: C, 75.96; H, 8.27; N, 11.12.

EXAMPLE 22

5-methyl-11-[3-(4-methyl-piperazino)-propylidene]-5,6-dihydromorphanthridine 5-methyl-11-hydroxy-11-[3-(4 - methyl - piperazino)-propyl] - 5,6 - dihydromorphanthridine (20.4 g., 0.056 mole) was dissolved in 300 ml. of chloroform and hydrogen chloride was bubbled through the solution until pH 1. Acetyl chloride (15.0 g., 0.19 mole) dissolved in chloroform (100 ml.) was added dropwise and the solution was refluxed for two hours. The solvent was removed in vacuo to yield a solid which was dissolved in 300 ml. of water and extracted with ethyl ether. The aqueous solution was then made alkaline with potassium hydroxide and extracted with ethyl ether and the extracts combined and dried. The solvent was removed in vacuo to yield a heavy brown oil.

The dihydrogen maleate salt was prepared from alcoholic solutions of the base and maleic acid and recrystallized twice from ethyl alcohol, M.P. 182–186° C.

*Analysis.*—Calcd. $C_{31}H_{37}N_3O_8$: C, 64.23; H, 6.43; N, 7.26; Maleic Acid, 40.05. Found: C, 64.04; H, 6.11; N, 7.15; Maleic Acid, 40.44.

EXAMPLE 23

5-methyl-11-hydroxy-11-[3-(N - methyl-N-benzylamino)-2-methylpropyl]-5,6 - dihydromorphanthridine and 5-methyl-11-[3-(N-methyl-N-benzylamino) - 2 - methylpropylidene]-5,6-dihydromorphanthridine To the Grignard reagent prepared from 7.3 g. (0.3 atom) of magnesium and 63.5 g. (0.3 mole) of 1-chloro-2-methyl-3-(N - methyl-N-benzyl)amino propane in 200 ml. of tetrahydrofuran was added at room temperature 33.4 g. (0.15 mole) of 5-methyl-5,6-dihydro-11-morphanthridone in 300 ml. of tetrahydrofuran. The solution was stirred for 24 hours at room temperature after which the complex was decomposed by addition of 70 ml. of saturated ammonium chloride solution. The inorganic salts were filtered off and the filtrate was dried and taken to dryness in vacuo to yield the crude intermediate carbinol. Infrared spectra confirmed the structure of the carbinol which was dissolved in 400 ml. of chloroform. Anhydrous hydrogen chloride was bubbled through the solution until pH 1. Acetyl chloride (41.3 g., 0.53 mole) was added dropwise and the solution refluxed for 2 hours. The solvent was removed in vacuo, the residue dissolved in 1500 ml. of water and extracted with ether. The aqueous solution was then made alkaline with potassium hydroxide, extracted with ether and the extracts combined and dried. The solvent was removed in vacuo to yield a thin liquid which was fractionated twice to yield 29.8 g. (52%), B.P. 214–225° C. (1.8 mm.).

*Analysis.*—Calcd. for $C_{27}H_{30}N_2$: C, 84.77; H, 7.91; N, 7.32. Found: C, 84.65; H, 7.77; N, 7.65.

EXAMPLE 24

5-methyl-11-{3-[ N - methyl-N-(S - ethylthiocarbonyl)-amino]-2-methylpropylidene} - 5,6 - dihydromorphanthridine Ethyl thiochloroformate (10.4 g., 0.84 mole) was added dropwise to a refluxing solution of 29.0 g. (0.076 mole) of 5-methyl-11-[3-(N - methyl-N-benzylamino)-2-methylpropylidene]-5,6-dihydromorphanthridine in 100 ml. of anhydrous benzene. The solution was refluxed for 18 hours after which it was steam distilled. The residue was dissolved in 200 ml. of benzene, washed with water, dried and taken to dryness in vacuo to yield 28.8 g. (100%), 5.0 g. of which was fractionated to yield 4.4 g. (88%) B.P. 217–223° C. (1.2 mm.).

EXAMPLE 25

5-methyl-11-(3-N-methylamino-2-methylpropylidene)-5,6-dihydromorphanthridine

A mixture of 10 g. (0.026 mole) of 5-methyl-11-{3-[N-methyl-N-(S-ethylthiocarbonyl)amino] - 2 - methylpropylidene}-5,6-dihydromorphanthridine, 200 ml. of ethylene glycol and 16.8 g. (0.053 mole) of barium hydroxide was refluxed 8 hours after which it was poured into 500 ml. of water and filtered. The collected solids were washed thoroughly with benzene which was combined with benzene extraction of the filtrate, dried and taken to dryness in vacuo to yield the crude base which was fractionated two times to yield 7.0 g. (91%) B.P. 170–175° C. (0.2 mm.).

*Analysis.*—Calcd. for $C_{20}H_{24}N_2$: C, 82.15; H, 8.27; N, 9.57. Found: C, 81.94; H, 8.22; N, 9.65.

As is obvious from an examination of the structures of the 11-(aminoalkylidene) - 5,6-dihydromorphanthridines and the unsymmetrical 11-[(cyclicamino)ene]-5,6-dihydromorphanthridines, geometrical isomers of these compounds are possible. Thus, for example, 5-methyl-11-(3-dimethylaminopropylidene) - 5,6 - dihydromorphanthridine, and 5-methyl-11-(1,2-dimethyl-4-piperidylene)-5,6-dihydromorphanthridine exist in either a cis or trans from wherein the aminoalkyl chain has either a cis or trans relationship with the phenyl ring of the morphanthridine moiety to which the 5-position nitrogen is attached. These isomers can be separated or interconverted using standard techniques such as equilibration with iodine or acid, or separation by selective crystallization and column or vapor phase chromatography.

Various changes and modifications of the invention can be made and, to the extent that such variations incorporate the spirit of this invention, they are intended to be included within the scope of the appended claims.

What is claimed is:

1. Compounds of the formula

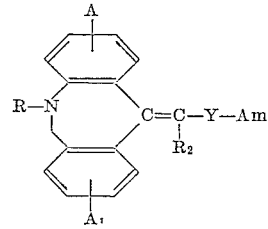

and nontoxic physiologically acceptable acid addition salts and lower alkyl quaternary ammonium salts thereof wherein A and $A_1$ are members of the group consisting of hydrogen, halogen, lower alkoxy, lower alkyl, thio-lower alkyl and trifluoromethyl groups, $R_2$ is a member of the group consisting of hydrogen, lower alkyl, lower alkenyl, lower alkynyl, phenyl-lower alkyl and phenyl-lower alkenyl, R is a member of the group consisting of diphenylmethyl, trityl, naphthylmethyl and the groups represented by $R_2$, Y is a member of the group consisting of a chemical bond and lower alkylene groups and Am is a member of the group consisting of

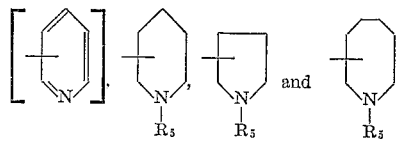

wherein $R_5$ represents the groups defined by R and Am represents the grouping

when Y is a lower alkylene wherein $R_3$ and $R_4$ are members of the group consisting of hydrogen, lower alkyl, lower alkenyl, phenyl-lower alkyl, diphenylmethyl, trityl, naphthylmethyl, cycloalkyl, cycloalkyl-lower alkyl, and groups in which

represents a member of the group consisting of morpholino, pyrrolidino, piperidino, piperazino, N-lower alkyl-piperazino, N-(phenyl-lower alkyl)-piperazino, N-(hydroxy-lower alkyl)-piperazino and N-(trityl)-piperazino when Y is a lower alkylene.

2. A member of the group consisting of compounds of the formulae

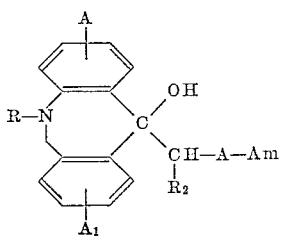

and nontoxic physiologically acceptable acid addition salts and lower alkyl quaternary ammonium salts thereof wherein A and $A_1$ are members of the group consisting of hydrogen, halogen, lower alkoxy, lower alkyl, thio-lower alkyl and trifluoromethyl groups, $R_2$ is a member of the group consisting of hydrogen, lower alkyl, lower alkenyl, lower alkynyl, phenyl-lower alkyl, and phenyl-lower alkenyl, R is a member of the group consisting of diphenylmethyl, trityl, naphthylmethyl and the groups represented by $R_2$, Y is a member of the group consisting of a chemical bond and lower alkylene groups and Am is a member of the group consisting of

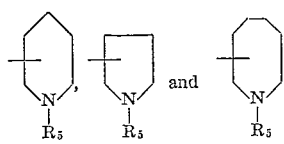

wherein $R_5$ represents the groups defined by R, and Am represents the grouping

when Y is a lower alkylene wherein $R_3$ and $R_4$ are members of the group consisting of hydrogen, lower alkyl, lower alkenyl, phenyl-lower alkyl, diphenylmethyl, trityl, naphthylmethyl, cycloalkyl, cycloalkyl-lower alkyl, and groups in which

represents a member of the group consisting of morpholino, pyrrolidino, piperidino, piperazino, N-lower alkyl-piperazino, N-(phenyl-lower alkyl)-piperazino, N-(hydroxy-lower alkyl)-piperazino and N-(trityl)-piperazino when Y is a lower alkylene.

3. Compounds of the formula

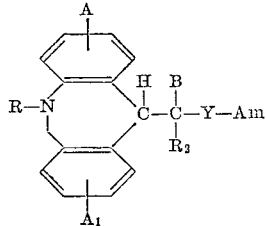

and nontoxic physiologically acceptable acid addition salts and lower alkyl quaternary ammonium salts thereof wherein A and $A_1$ are members of the group consisting of hydrogen, halogen, lower alkoxy, lower alkyl, thio-lower alkyl and trifluoromethyl groups, B is a member of the group consisting of the hydroxy group and groups of the formula

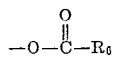

wherein $R_6$ is lower alkyl, $R_2$ is a member of the group consisting of hydrogen, lower alkyl, lower alkenyl, lower alkynyl, phenyl-lower alkyl and phenyl-lower alkenyl, R is a member of the group consisting of diphenylmethyl, trityl, naphthylmethyl and the groups represented by $R_2$, Y is a member of the group consisting of a chemical bond and lower alkylene groups and Am is a member of the group consisting of

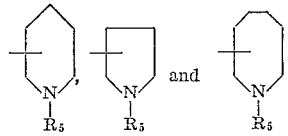

wherein $R_5$ represents the groups defined by R and Am represents the grouping

when Y is a lower alkylene wherein $R_3$ and $R_4$ are members of the group consisting of hydrogen, lower alkyl, lower alkenyl, phenyl-lower alkyl, diphenylmethyl, trityl, naphthylmethyl, cycloalkyl, cycloalkyl-lower alkyl, and groups in which

represents a member of the group consisting of morpholino, pyrrolidino, piperidino, piperazino, N-lower alkyl-piperazino, N-(phenyl-lower alkyl)-piperazino, N-(hydroxy-lower alkyl)-piperazino and N-(trityl)-piperazino when Y is a lower alkylene.

4. 5-lower alkyl-11-(1-hydroxy-di-lower alkyl-amino lower alkyl)-5,6-dihydromorphanthridine.

5. 5-lower alkyl-11-(1-hydroxy-piperidino-lower alkyl)-5,6-dihydromorphanthridine.

6. 5-lower alkyl-11-(di-lower alkyl-amino-lower alkylidene)-5,6-dihydromorphanthridine.

7. 5-lower alkyl-11-(piperidino-lower alkylidene)-5,6-dihydromorphanthridine.

8. 5-methyl-11-(3-dimethylaminopropylidene)-5,6-dihydromorphanthridine.

9. 2 - chloro - 5-methyl-11-(3-dimethylamino-2-methylpropylidene)-5,6-dihydromorphanthridine.

10. 5 - methyl - 11-(3-N-methyl-N-benzylaminopropylidene)-5,6-dihydromorphanthridine.

11. 5 - methyl - 11-(3-N-methylaminopropylidene)-5,6-dihydromorphanthridine.

12. 5-methyl-11-[3-(4-methylpiperazino)propylidene]-5,6-dihydromorphanthridine.

13. 5 - methyl - 11 - [3-(N-methyl-N-benzylamino)-2-methylpropylidene]-5,6-dihydromorphanthridine.

14. 5 - methyl - 11-(3-N-methylamino-2-methylpropylidene)-5,6-dihydromorphanthridine.

15. 2 - chloro - 5 - methyl-11-(3-dimethylaminopropylidene)-5,6-dihydromorphanthridine.

16. Compounds of the formula

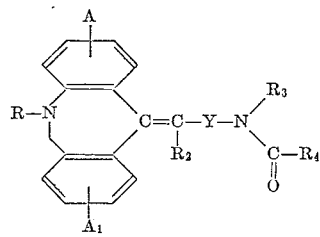

and nontoxic acid addition salts and lower alkyl quaternary ammonium salts thereof, wherein A and $A_1$ are members of the group consisting of hydrogen, halogen, lower alkoxy, lower alkyl, thio-lower alkyl and trifluoromethyl groups, $R_2$ is a member of the group consisting of hydrogen, lower alkyl, lower alkenyl, lower alkynyl, phenyl-lower alkyl and phenyl-lower alkenyl, R is a member of the group consisting of diphenylmethyl, trityl, naphthylmethyl and the groups represented by $R_2$, Y is a member of the group consisting of a chemical bond and lower alkylene groups, $R_3$ is a member of the group consisting of hydrogen, lower alkyl, lower alkenyl, cycloalkyl, cycloalkyl-lower alkyl, phenyl-lower alkyl having at least two carbons in a chain between the phenyl and nitrogen, diphenylmethyl, trityl and naphthylmethyl and $R_4$ is a member of the group consisting of lower aloxy, lower thioalkyl, phenoxy and thiophenyl.

17. 5-methyl-11-{3-[N-methyl-N-(S-methylthiocarbonyl)amino]propylidene}-5,6-dihydromorphanthridine.

18. 5 - methyl-11-{3-[N-methyl-N-(S-ethylthiocarbonyl)amino] - 2 - methylpropylidene}-5,6-dihydromorphanthridine.

19. 5 - lower alkyl - 11 - hydroxy-11-(di-lower alkylamino-alkyl)-5,6-dihydromorphanthridine.

20. 5-methyl-11-hydroxy-11-(3-dimethylaminopropyl)-5,6-dihydromorphanthridine.

21. 5 - lower alkyl-11-hydroxy-11-[(N-lower alkyl-N-benzylamino)-lower alkyl]-5,6-dihydromorphanthridine.

22. 5 - methyl - 11-hydroxy-11-(3-N-methyl-N-benzylaminopropyl)-5,6-dihydromorphanthridine.

23. 2 - chloro - 5 - methyl - 11-hydroxy-11-(3-dimethylaminopropyl)-5,6-dihydromorphanthridine.

24. 2 - chloro - 5 - methyl - 11-hydroxy-11-(3-dimethylamino-2-methylpropyl)-5,6-dihydromorphanthridine.

25. 5 - methyl-11-hydroxy-11-[3-(4-methylpiperazino)propyl]-5,6-dihydromorphanthridine.

References Cited

UNITED STATES PATENTS 3,153,652  10/1964  Drukker et al. _____ 260—239

FOREIGN PATENTS 568,611  12/1958  Belgium.

OTHER REFERENCES

Gilman, Organic Chemistry, vol. 1 (New York, 1938) p. 448.

Wagner et al., Synthetic Organic Chemistry (New York, 1953), pp. 159–163.

ALTON D. ROLLINS, *Primary Examiner*.

UNITED STATES PATENT OFFICE
CERTIFICATE OF CORRECTION

Patent No. 3,381,000
April 30, 1968

Alexander E. Drukker et al.

It is certified that error appears in the above identified patent and that said Letters Patent are hereby corrected as shown below:

Column 2, line 57, "1,2,3,4-tetrahyisoquino" should read -- 1,2,3,4-tetrahydroisoquino --. Column 12, line 68, "5-phenylethyl" should read -- 5-phenethyl --. Column 16, line 21, "recation" should read -- reaction --. Column 18, line 19, "19.5 of water" should read -- 19.5 c.c. of water --; same line 19, ""percipitate" should read -- precipitate --; line 22, "M.P. 135.5" should -- 133.5 --. Column 22, lines 48 to 53, cancel the extreme left-hand formula. Column 25, line 7, "aloxy" should read -- alkoxy --.

Signed and sealed this 10th day of March 1970.

(SEAL)
Attest:

Edward M. Fletcher, Jr.
Attesting Officer

WILLIAM E. SCHUYLER, JR.
Commissioner of Patents